United States Patent
Iannone et al.

(10) Patent No.: US 7,738,164 B2
(45) Date of Patent: Jun. 15, 2010

(54) MULTI-BAND HYBRID SOA-RAMAN AMPLIFIER FOR CWDM

(75) Inventors: Patrick P. Iannone, Red Bank, NJ (US);
Kenneth C. Reichmann, Hamilton, NJ (US); Xiang Zhou, Middletown, NJ (US)

(73) Assignee: AT&T Corp., New York, NY (US)

( * ) Notice: Subject to any disclaimer, the term of this patent is extended or adjusted under 35 U.S.C. 154(b) by 4 days.

(21) Appl. No.: 12/315,353

(22) Filed: Dec. 2, 2008

(65) Prior Publication Data

US 2009/0080893 A1  Mar. 26, 2009

(51) Int. Cl.
*H04B 10/17* (2006.01)
*H01S 5/00* (2006.01)
*H04B 10/12* (2006.01)

(52) U.S. Cl. ............. 359/334; 359/341.3; 359/344
(58) Field of Classification Search ............. 359/334, 359/344, 341.3
See application file for complete search history.

(56) References Cited

U.S. PATENT DOCUMENTS

| | | | | |
|---|---|---|---|---|
| 6,052,219 A | * | 4/2000 | Kidorf et al. | 359/334 |
| 7,126,747 B2 | * | 10/2006 | Lee | 359/334 |
| 2002/0191277 A1 | * | 12/2002 | Chen et al. | 359/341.4 |
| 2004/0175187 A1 | * | 9/2004 | Eiselt et al. | 398/173 |
| 2004/0196543 A1 | * | 10/2004 | Akiyama | 359/344 |
| 2004/0246566 A1 | * | 12/2004 | Miyamoto et al. | 359/334 |
| 2006/0126159 A1 | * | 6/2006 | Chung et al. | 359/334 |

* cited by examiner

*Primary Examiner*—Eric Bolda

(57) ABSTRACT

A multi-band hybrid amplifier is disclosed for use in optical fiber systems. The amplifier uses Raman laser pumps and semiconductor optical amplifiers in series to produce a relatively level gain across the frequency range of interest. Multiple Raman pumps are multiplexed before coupling into the fiber. The Raman amplified optical signal may be demultiplexed and separately amplified by the SOAs before re-multiplexing. Gain profiles of the Raman pumps and the SOAs are selected to compensate for gain tilt and to alleviate the power penalty due to cross-gain modulation in the SOAs. The disclosed hybrid amplifier is especially useful in coarse wavelength division multiplexing (CWDM) systems.

19 Claims, 4 Drawing Sheets

MULTI-BAND HYBRID SOA-RAMAN AMPLIFIER FOR CWDM

CLAIM OF PRIORITY

This application claims priority to, and incorporates by reference herein in its entirety, pending U.S. patent application Ser. No. 11/543,650, filed Oct. 5, 2006, entitled "Multi-Band Hybrid SOA-Raman Amplifier for CWDM,", which is a divisional of U.S. patent application Ser. No. 11/260,449, filed Oct. 27, 2005, entitled "Multi-Band Hybrid SOA-Raman Amplifier for CWDM," which claims priority to U.S. Provisional Patent Application Ser. No. 60/693,158, filed Jun. 23, 2005, and entitled "Multi-Band Hybrid SOA-Raman Amplifier for CWDM."

FIELD OF THE INVENTION

The present invention relates generally to transporting multiple wavelength channels on a single optical fiber over moderate distances and, more particularly, to a multiband hybrid amplifier for use in coarse wavelength division multiplexing transmission systems.

BACKGROUND OF THE INVENTION

Coarse wavelength division multiplexing (CWDM) has recently emerged as an inexpensive technology for transporting multiple wavelength channels on a single optical fiber over moderate distances. CWDM's low cost relative to dense wavelength division multiplexing (DWDM) is attributed to the fact that the CWDM spectrum is orders of magnitude sparser than a typical DWDM spectrum. The ITU standard for CWDM defines a maximum of 18 wavelength channels with a channel-to-channel wavelength separation of 20 nm. That large channel spacing permits a 13-nm channel bandwidth, which in turn makes possible the use of inexpensive CWDM optics and directly modulated, un-cooled semiconductor laser transmitters. In contrast, DWDM systems, with typical channel spacings of 0.8 or 0.4 nm, require tightly specified and controlled laser transmitters, since the laser wavelength must fall within a small fraction of a nanometer over the entire life of the laser (typically ±0.1 nm for a system with 0.8-nm channel spacing). Their relatively small channel counts make CWDM systems the natural choice for transporting wavelengths at the edge of the network, where traffic is not highly aggregated as it is in the network core.

CWDM is considered an un-amplified technology since the large wavelength spread occupied by all channels in a typical commercial CWDM system (73 nm for a 4-channel system, 153 nm for an 8-channel system) cannot be accommodated by readily available low cost optical amplifiers. For example, inexpensive erbium-doped fiber amplifiers have an optical bandwidth of only about 30 nm. Being an un-amplified technology limits the reach of most commercial CWDM systems to approximately 80 km. That constraint could be overcome with the invention of a low-cost, broadband optical amplifier.

Although, in practice, semiconductor optical amplifiers (SOA) are capable of amplifying as many as 4 CWDM channels per SOA, the trade-off between maintaining sufficient optical signal-to-noise ration (OSNR) and reducing gain saturation induced crosstalk reduces the dynamic range of pure SOA solutions while rendering them inadequate for systems with cascaded amplifiers.

Raman amplifiers have been tried in this Application. A Raman amplifier is based on the nonlinear optical interaction between the optical signal and a high power pump laser. The gain medium may be the existing optical fiber or may be a custom highly non-linear fiber. A recently disclosed all-Raman amplifier covering the commercially-standard 8 CWDM channel wavelengths exhibited approximately 10 dB lower gain yet required 7 Raman pumps with widely varying pump powers, a total launched power over 1100 mW, and a custom highly nonlinear fiber (HNLF) gain medium.

Several fiber network providers are currently either evaluating or deploying CWDM systems to reduce costs. All those who deploy CWDM will have situations that require extending reach. With present technology, their only solution will be to install an expensive regenerator to perform the following steps: 1) optically demultiplex the CWDM channels; 2) convert each optical channel to analog electrical signals; 3) amplify the analog electrical signals; 4) recover the system clock; 5) use a decision circuit to regenerate a re-timed digital electrical data stream from the analog data and the recovered system clock; 6) use this electrical data to drive a CWDM laser transmitter for each channel; and 7) multiplex the various CWDM wavelengths onto the common transmission fiber. All of those (steps 1-7) could be replaced by a single low-cost optical amplifier.

There remains a need for a cost-effective amplifier that is useful with commercially-available CWDM systems, while minimizing the above-described disadvantages.

SUMMARY OF THE INVENTION

The present invention addresses the needs described above by providing a method and system for amplifying an optical signal. In one embodiment of the invention, a data transport system is provided. The system includes an optical fiber cable, at least one coarse wavelength division multiplexer (CWDM) for transmitting an optical signal on the fiber within plurality of signal channels, at least one Raman pump having a pumping frequency outside any signal channel, coupled to the fiber to amplify the signal, and at least one semiconductor optical amplifier (SOA) having a gain over at least one of the signal channels, connected to the fiber to amplify the signal.

A gain of the at least one Raman pump may increase as a function of frequency within the frequency range, and the gain of the at least one SOA may decrease within the frequency range. The sum of those gains may be more constant over the frequency range than the individual gains.

The at least one Raman pump may comprise a plurality of Raman pumps, outputs of which are multiplexed by a pump multiplexer. The output of the pump multiplexer may be coupled onto the optical fiber cable via an optical circulator.

Another embodiment of the invention is a hybrid optical amplifier for amplifying an optical signal. The optical signal is transmitted on an optical fiber and has a frequency range. The amplifier includes at least one Raman pump coupled to the fiber, having a gain within the frequency range and creating a Raman amplified signal. The hybrid amplifier further includes a band demultiplexer for splitting the Raman amplified signal propagating in the fiber into a plurality of band signals having band frequency ranges, at least one semiconductor optical amplifier (SOA), each said SOA connected for amplifying a band signal of the plurality of band signals, and having a gain within the band frequency range of the band signal, and a band multiplexer for recombining the band signals after amplification.

In that embodiment of the hybrid amplifier, the at least one Raman pump may comprise three Raman pumps, outputs of which are multiplexed by a pump multiplexer. An output of the pump multiplexer may be coupled onto the optical fiber cable via an optical circulator.

The optical signal may comprise a plurality of frequency bands, in which case a summed gain of the Raman pumps increases monotonically across each frequency band.

The optical signal may include at least two frequency channels having a null frequency range between the channels, and at least one of the Raman pumps in that case may include a pump laser having a frequency within the null frequency range.

The Raman pumps may include a first pump laser having emission wavelength 1365 nm and optical power coupled into the Raman gain medium 200 mW, a second pump having emission wavelength 1430 nm and optical power coupled into the Raman gain medium 250 mW, and a third pump having emission wavelength 1500 nm and optical power coupled into the Raman gain medium 150 mW.

The at least one SOA may comprise a plurality of SOAs, one connected for amplifying each band signal. The optical signal may comprise at least two frequency bands, wherein the at least one SOA comprises a single SOA amplifying a first of said frequency bands, and a second of said frequency bands is not amplified by an SOA. The optical signal may comprise an 8-channel spectrum, and wherein the band demultiplexer may split the spectrum into two 4-channel bands.

Yet another embodiment of the invention is a method for amplifying a CWDM optical signal having at least first and second frequency bands. The method includes the steps of amplifying the CWDM optical signal using at least one Raman pump coupled to the optical fiber cable, splitting the amplified CWDM optical signal into the at least two frequency bands, further amplifying at least one of the frequency bands using a semiconductor optical amplifier (SOA), and recombining the at least two frequency bands.

The at least one Raman pump may comprise a plurality of pump lasers, each having a different wavelength. The bands of the CWDM optical signal may comprise channels having null frequency ranges between them, in which case a wavelength of at least one of the plurality of pump lasers may be within the null frequency.

A net gain of the Raman amplifying step and the SOA amplifying step may be flat over the CWDM frequency range to within 5 dB. The CWDM optical signal may comprise an 8-channel spectrum split into two 4-channel bands, and each band may be separately amplified by an SOA. A wavelength spread occupied by the CWDM optical signal may be approximately 153 nm.

DESCRIPTION OF THE INVENTION

Figure 1:
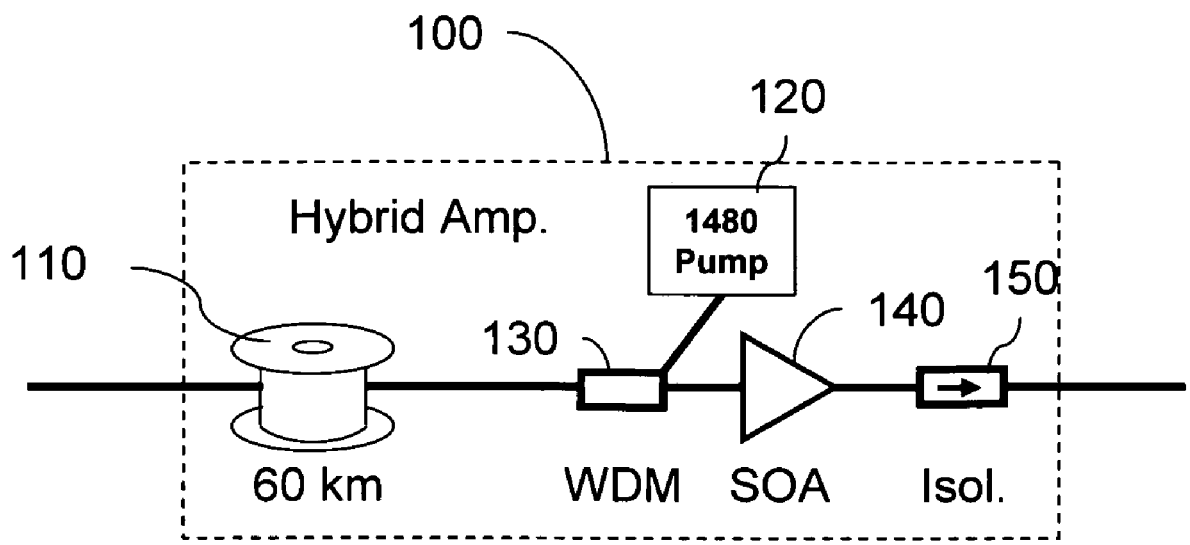
FIG. 1 is a schematic representation of a prior art hybrid amplifier.

The presently-described invention is a multi-band hybrid SOA-Raman amplifier capable of amplifying all 8 CWDM channels typically used in today's commercial systems. As described herein, the unique design of this amplifier not only facilitates simultaneous amplification of the 8-channel band, but makes possible relatively long distance transmission via a multi-amplifier cascade.

The Hybrid Amplifier

The inventors recently measured gain and transmission system bit-error rate performance for a broadband (4 channels from 1510 nm to 1570 nm) hybrid amplifier based on a single SOA and a single Raman pump laser. That amplifier 100, which has been previously demonstrated for DWDM systems, is shown schematically in FIG. 1. A backward propagating semiconductor Raman pump laser 120 is coupled to the transmission fiber 110 with a wavelength division multiplexing (WDM) coupler 130, followed by a conventional polarization independent SOA 140 and an optical isolator 150.

The Raman pump wavelength is chosen to compliment the SOA such that the combined gain of the hybrid amplifier is both increased and flattened as compared to the SOA alone. A plot 200 of measured gains of the components of the hybrid amplifier of FIG. 1 is presented in FIG. 2. Specifically, that figure shows the measured gain spectra 230 of the SOA alone (triangles), Raman amplifier 220 alone (diamonds), and the hybrid amplifier 250 (squares). In this case, the Raman pump laser operated at 1480-nm wavelength with 300-mW coupled into the transmission fiber, and the SOA gain peak was approximately 1510-nm wavelength. The transmission fiber, which is necessary to provide Raman gain, was 60 km of standard reduced water peak fiber (OFS AllWave® fiber). Similar performance is expected for other common transmission fiber types including standard single-mode fiber.

Figure 2:
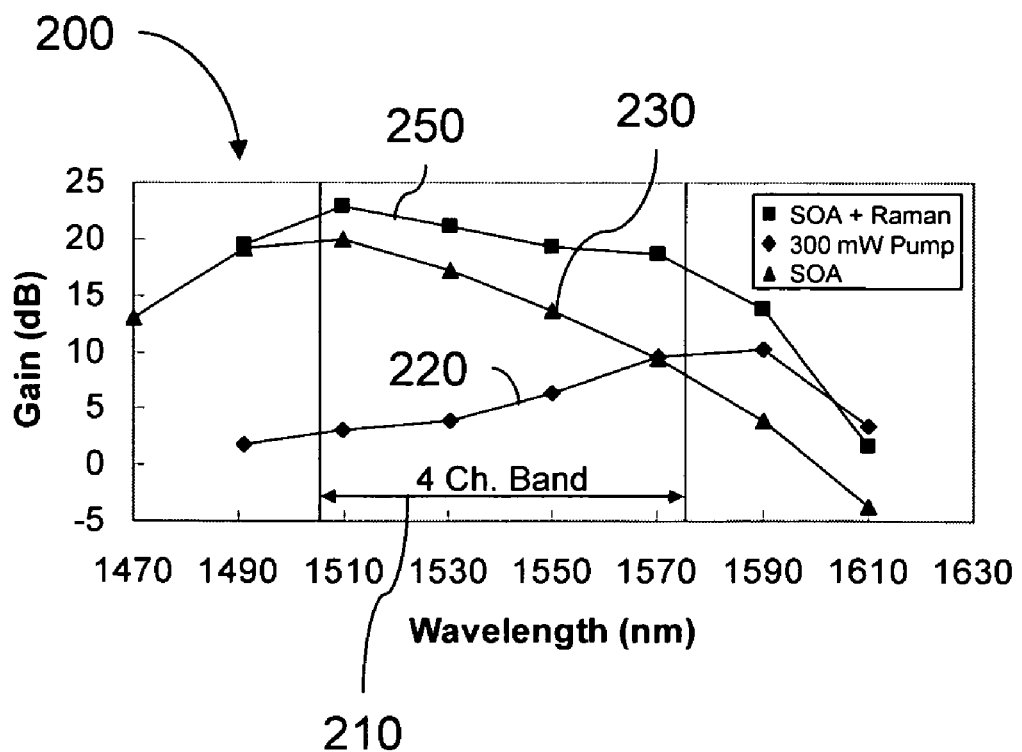
FIG. 2 is a gain versus wavelength plot representing several components of the amplifier of FIG. 1.

As shown by the curves of FIG. 2, the SOA gain 230 decreases monotonically from short wavelength to long wavelength within the 4 channel CWDM band 210. The Raman gain 220 has the opposite trend, increasing with increasing wavelength. Aside from the obvious gain enhancement and gain-tilt compensation, this amplifier arrangement has another more subtle advantage: this design alleviates the power penalty due to cross-gain modulation (saturation) in the SOA. The pre-emphasis of the long-wavelength channels by the Raman gain permits positioning of the 4 channel band 210 to the long-wavelength side of the SOA gain peak, where cross-gain modulation is reduced. Those three attributes make this amplifier far more promising as a candidate for multi-amplifier cascades. The increase in gain and gain flatness helps preserve optical signal-to-noise ratio over a multi-amplifier cascade, and the resistance to cross-gain modulation prevents signal degradation due to crosstalk. Naturally, with the proper choice of Raman pump wavelength and SOA gain peak, that same arrangement could be implemented to cover any contiguous 4 channel band within the 18-channel CWDM spectrum; however, higher pump power would be required at shorter wavelengths due to increased fiber loss.

The Hybrid Multi-Band Amplifier

Figure 3:
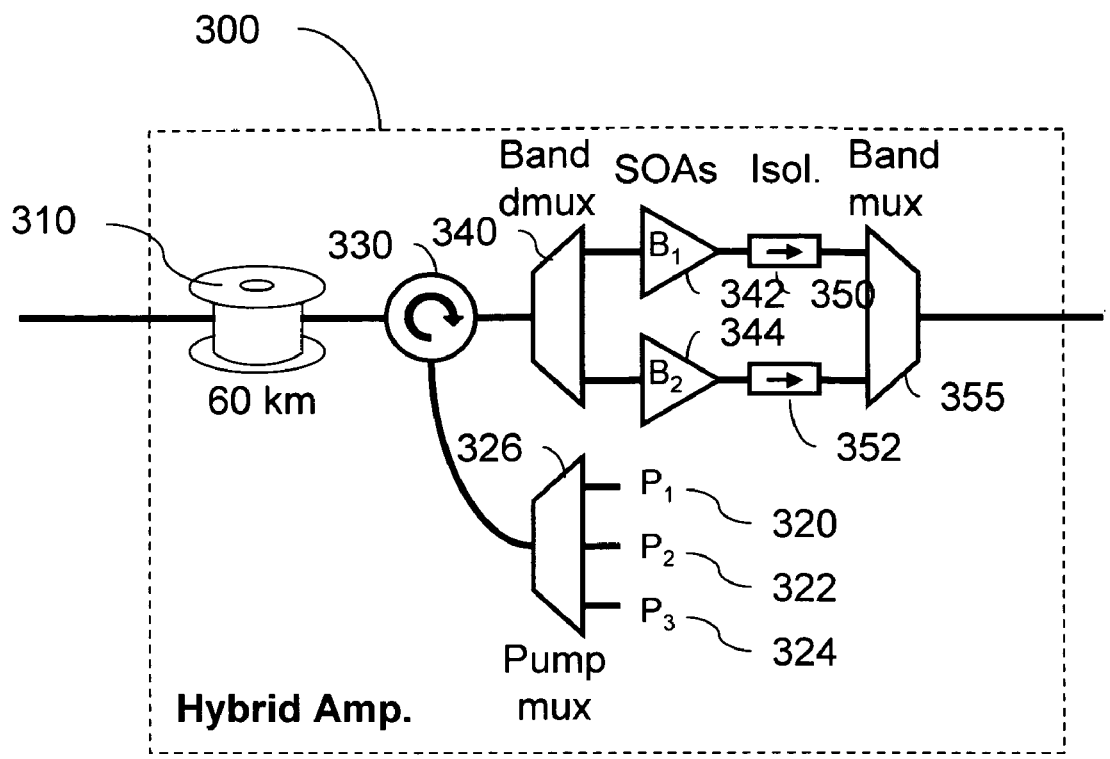
FIG. 3 is a schematic representation of a hybrid amplifier according to one embodiment of the invention.

Although the optical bandwidths of the SOA and Raman gain are naturally well suited to a 4-channel hybrid amplifier design, most commercial CWDM systems employ 8 CWDM channels from 1470 nm to 1610 nm. The inventors have developed novel two-band variations of the hybrid SOA-Raman amplifier capable of amplifying the entire commonly used 8 channel band. FIG. 3 is a schematic representation of a hybrid two-band amplifier 300. Multiple pumps 320, 322, 324, shown in the drawing as $P_1$, $P_2$ and $P_3$, are multiplexed together in a pump multiplexer 326 and coupled onto the transmission fiber 310 via an optical circulator 330. The Raman amplified 8-channel spectrum is split into two 4-channel bands in the band demultiplexer 340, and each band is separately amplified by SOAs ($B_1$) 342 and ($B_2$) 344. The SOAs 342, 344 are followed by optical isolators 350, 352, and the amplified bands are recombined in band multiplexer 355.

Figure 4:
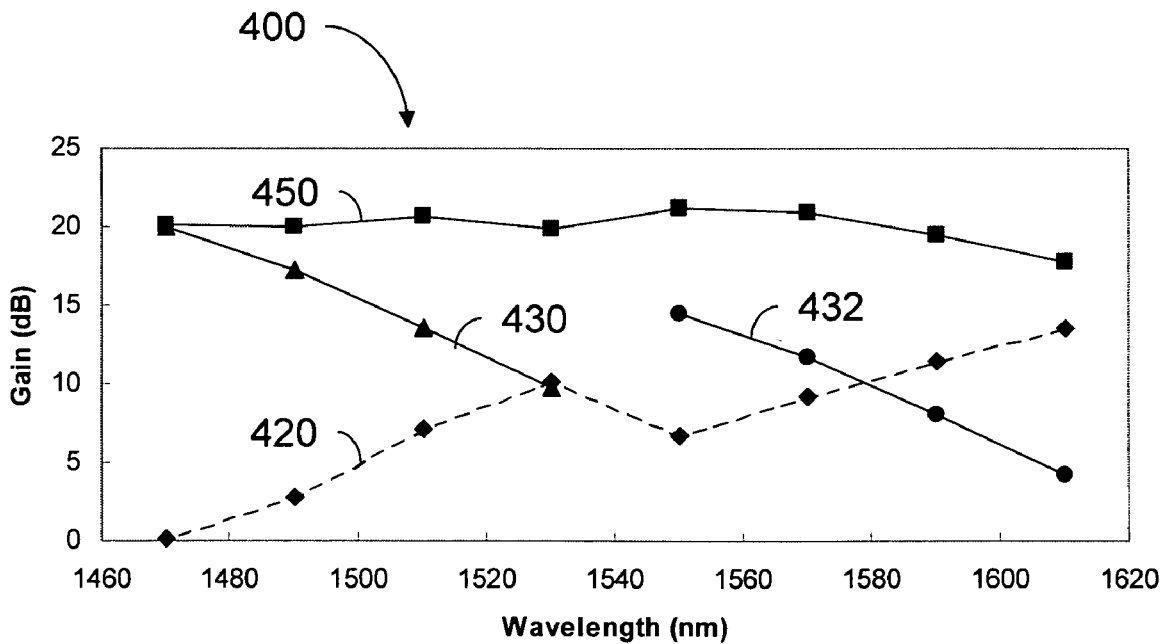
FIG. 4 is a gain versus wavelength plot representing several components of the amplifier of FIG. 3.

Although the hybrid amplifier 300 of FIG. 3 is shown with three Raman pumps 320, 322, 324, the number of pumps, pump wavelengths and pump powers may vary depending on the desired peak gain and gain shape. One exemplary configuration having three Raman pumps is represented in the plot 400 of FIG. 4. The curve 420 (diamonds) shows the calculated on-off Raman gain for three pumps 320, 322, 324 with wavelengths 1365 nm, 1430 nm, and 1500 nm, and having pump powers of 200 mW, 250 mW, and 150 mW, respectively. The moderate net resulting Raman gain 420, monotonically increasing across each of the two 4 channel bands, serves the same purpose as the Raman gain in the previously described single-band amplifier: it improves gain, improves optical signal-to-noise ratio (OSNR) and decreases gain tilt across each 4-channel band, while allowing operation in the low-crosstalk region of the SOA spectra. The 1500-nm pump, although falling within the overall 8-channel band, is situated at the null between the 1490-nm and 1510-nm channels and thus should not result in excessive Rayleigh backscattered pump light impinging on the channel receivers.

Typical SOA gains for SOAs ($B_1$) 430 (triangles) and ($B_2$) 432 (circles), respectively, are then added to the Raman gain resulting in the overall calculated net gain 450 of the hybrid two-band amplifier (squares). The net gain is relatively flat over the 8-channel band, with a peak gain of 21.2 dB at 1530 nm and a minimum gain of 17.7 dB at 1610 nm. The fact that Raman gain for a single pump wavelength naturally increases with increasing signal wavelength, results in a simpler and less costly Raman implementation for this 2-band hybrid amplifier as compared to an all-Raman design.

Figure 5:
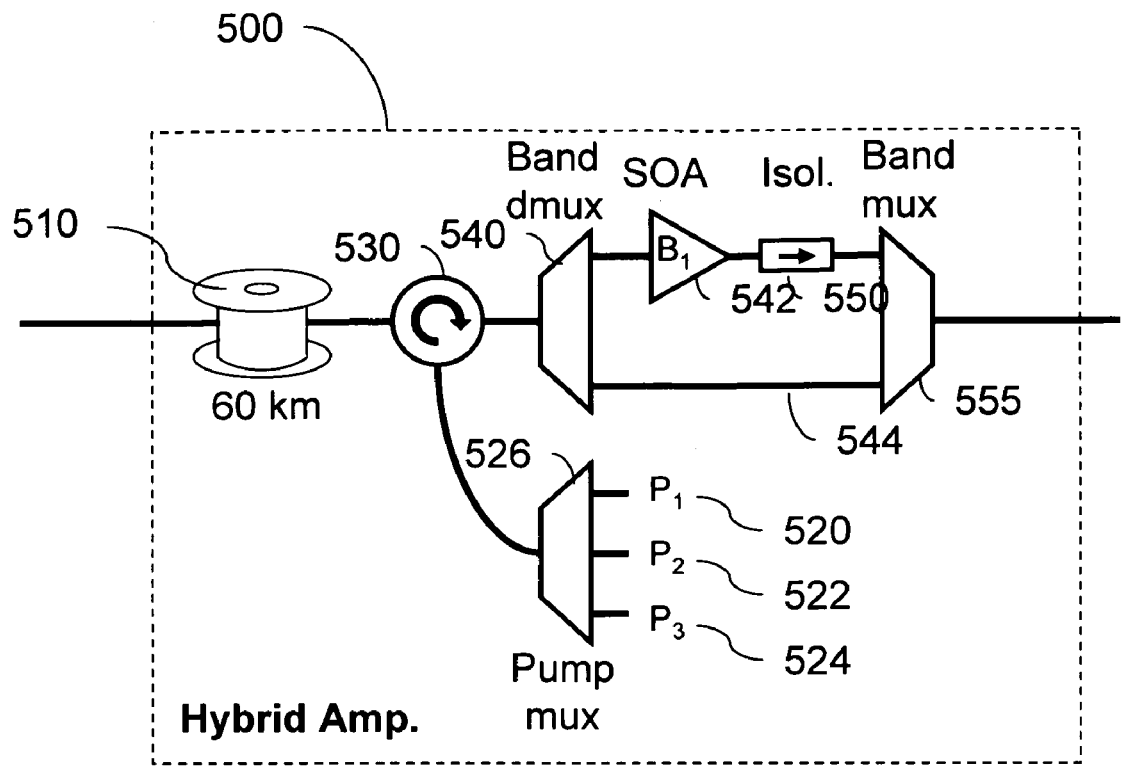
FIG. 5 is a schematic representation of a hybrid amplifier according to another embodiment of the invention.

FIG. 5 shows a variation 500 of the two-band hybrid SOA-Raman amplifier which uses only one SOA 542 rather than two. The SOA 542 is followed by an optical isolator 550 and is between demultiplexer 540 and multiplexer 555, as in the example of FIG. 3. Signals 544 within one of the bands do not pass through an SOA. That simpler design comes at the expense of increased Raman pump powers. Three backward propagating pump lasers, $P_1$ (520) at 1365 nm, $P_2$ (522) at 1455 nm and $P_3$ (524) at 1500 nm, have output powers of 300 mW, 320 mW, and 220 mW, respectively.

Although only one SOA 542 is used, the proposed amplifier 500 still employs a dmux-mux pair 540, 555 to split (combine) the 8-channel band before (after) SOA $B_1$. That conservative design may not be necessary if SOA $B_1$ exhibits sufficiently low excess loss and polarization dependant loss (PDL) over the long wavelength half of the spectrum (in which case, the dmux and mux 540, 555 can be omitted).

Figure 6:
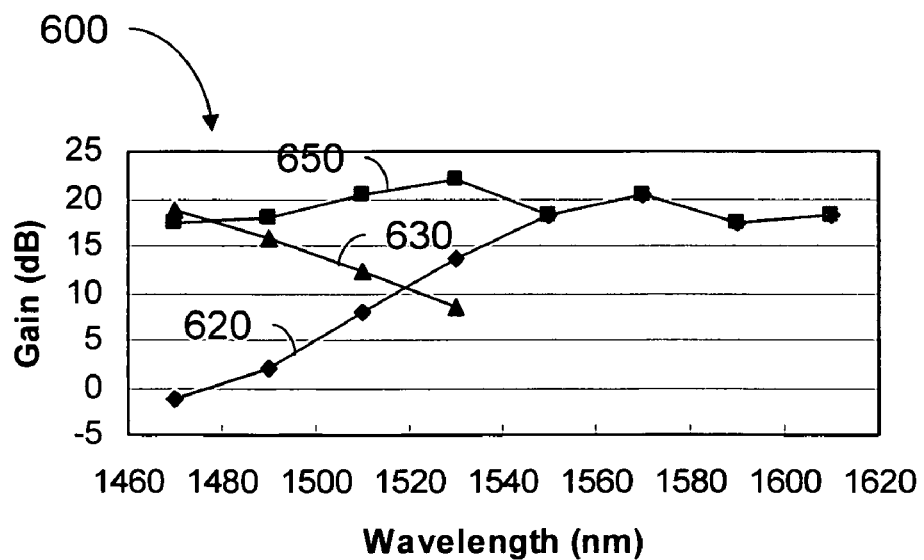
FIG. 6 is a gain versus wavelength plot representing several components of the amplifier of FIG. 5.

The calculated gain for this amplifier configuration is shown in FIG. 6. Diamonds again represent the calculated Raman gain 620. In this case, rather than a Raman gain spectrum that increases over each of the two 4-channel subbands, the Raman gain increases over the short wavelength 4 channel band (1470 nm, 1490 nm, 1510 nm, and 1530 nm), but remains relatively flat over the long wavelength 4-channel band (1550 nm, 1570 nm, 1590 nm, and 1610 nm). Thus, the Raman process provides all of the amplification for the long-wavelength sub-band, while the net short wavelength gain 650 (squares) is due to both Raman gain and the gain 630 from SOA $B_1$ (triangles).

For these particular Raman pump powers and SOA gain shape, this design exhibits slightly higher gain variation than the previous two-SOA design. The calculated net gain varies between a minimum of 17.4 dB and a maximum of 21.9 dB.

A Method According to the Invention

Figure 7:
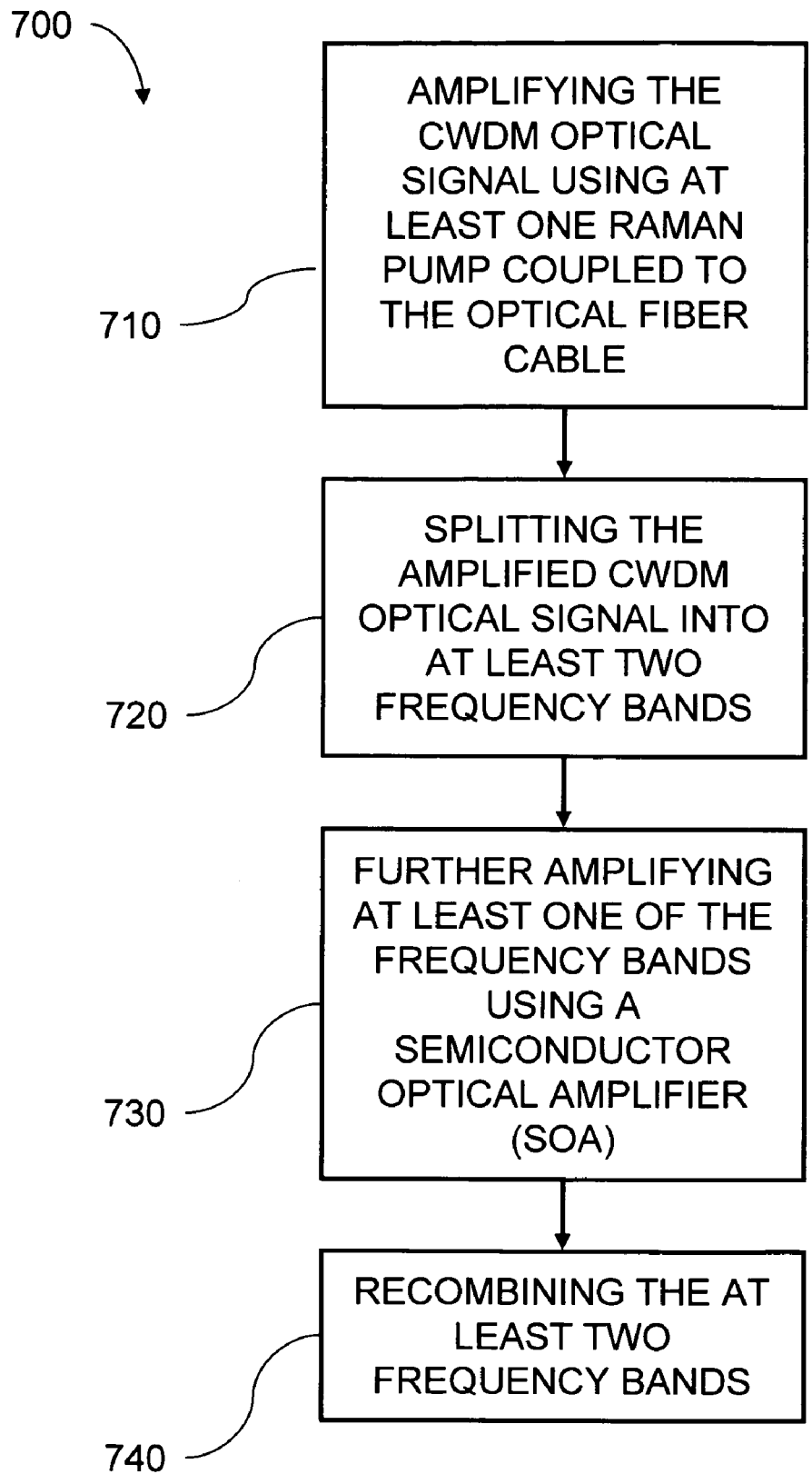
FIG. 7 is a flow chart showing a method according to one embodiment of the invention.

The invention described herein further contemplates a method 700, shown in FIG. 7, for amplifying a CWDM optical signal having at least first and second frequency bands. The wavelength spread occupied by the CWDM optical signal may be approximately 153 nm, the spread of many commercially-available CWDM systems. The CWDM optical signal may comprise an 8-channel spectrum split into two 4-channel bands.

The CWDM optical signal is amplified (step 710) using at least one Raman pump coupled to the optical fiber cable. The at least one Raman pump may be a plurality of pump lasers, each having a different wavelength. The bands of the CWDM optical signal may comprise channels having null frequency ranges between them, in which case a wavelength of at least one of the plurality of pump lasers may be within that null frequency, to prevent excessive Rayleigh backscattered pump light impinging on the channel receivers.

The amplified CWDM optical signal is then split (step 720) into frequency bands. At least one of the split frequency bands is further amplified (step 730) using a semiconductor optical amplifier (SOA). In a preferred embodiment, the net gain of the Raman amplifying step and the SOA amplifying step is flat over the CWDM frequency range to within 5 dB. Each band of the CWDM signal may be separately amplified by an SOA. The bands are then recombined (step 740).

SUMMARY

The inventors have proposed several new multi-band hybrid SOA-Raman amplifier designs for CWDM transmission systems. Both implementations are capable of simultaneously amplifying 8 CWDM channels from 1470-1610 nm. Calculations made by the inventors suggest that those cost effective designs will outperform both all-SOA and all-Raman amplifiers in terms of peak gain, gain shape and crosstalk tolerance, and are therefore well suited to applications that require cascaded amplifiers. Furthermore, the maximum individual pump powers required for each of the two designs (250 mW and 300 mW, respectively) are readily available from commercial semiconductor pump lasers.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to optical transmission using CWDM, the method and apparatus of the invention may be used with other optical multiplexing schemes wherein a relatively wide wavelength band width is occupied by the signal. It is to be understood that the embodiments shown and described herein are only illustrative of the principles of the present invention and that various modifications may be implemented by those skilled in the art without departing from the scope and spirit of the invention.

What is claimed is:

1. A method for transmitting an optical data signal, the method comprising the steps of:

multiplexing the data signal within a plurality of signal channels in a wavelength range using coarse wavelength division multiplexing (CWDM) to create a CWDM optical signal;

amplifying the CWDM optical signal using at least one Raman pump to create a Raman amplified signal;
further amplifying the Raman amplified signal using a semiconductor optical amplifier (SOA);
wherein at least one Raman pump has a pumping wavelength situated between two of the signal channels.

2. The method of claim 1, wherein each of the at least one Raman pumps has a pumping wavelength outside any of the signal channels.

3. The method of claim 1, wherein a gain due to the at least one Raman pump increases monotonically within each of said signal channels.

4. The method of claim 1, wherein a gain of the SOA decreases monotonically within the wavelength range.

5. The method of claim 1, wherein a net gain of the SOA and the Raman pump within each signal channel is flatter than either one of a gain of the SOA and a gain due to the Raman pump within the signal channel.

6. The method of claim 1, wherein the step of amplifying the CWDM optical signal using at least one Raman pump to create a Raman amplified signal, further comprises:
multiplexing pump lasers of a plurality of Raman pumps, each having a different wavelength.

7. The method of claim 1, wherein a net gain of the Raman amplifying step and the SOA amplifying step is flat within the wavelength range to within 5 dB.

8. The method of claim 1, wherein the CWDM optical signal comprises an 8-channel spectrum split into two 4-channel bands.

9. The method of claim 8, wherein a wavelength spread occupied by the CWDM optical signal is approximately 153 nm.

10. The method of claim 8, wherein the net gain over the two 4-channel bands is between 17.7 dB and 21.2 dB.

11. A method for transmitting an optical data signal, the method comprising the steps of:
multiplexing the data signal within a plurality of signal channels in a wavelength range using coarse wavelength division multiplexing (CWDM) to create a CWDM optical signal, the signal channels being separated by null frequency ranges;
amplifying the CWDM optical signal using a plurality of Raman pumps to create a Raman amplified signal, the Raman pumps having pumping wavelengths outside any of the signal channels, at least one of the Raman pumps having a pumping frequency in a null frequency range;
further amplifying the Raman amplified signal using a semiconductor optical amplifier (SOA).

12. The method of claim 11, wherein a gain of the SOA decreases monotonically within the wavelength range.

13. The method of claim 11, wherein a net gain of the SOA and the Raman pump within each signal channel is flatter than either one of a gain due to the SOA and a gain of the Raman pump within the signal channel.

14. The method of claim 11, wherein the step of amplifying the CWDM optical signal using a plurality of Raman pumps to create a Raman amplified signal, further comprises:
multiplexing pump lasers of the plurality of Raman pumps, each having a different wavelength.

15. The method of claim 11, wherein a net gain of the Raman amplifying step and the SOA amplifying step is flat within the wavelength range to within 5 dB.

16. The method of claim 11, wherein the CWDM optical signal comprises an 8-channel spectrum split into two 4-channel bands.

17. The method of claim 16, wherein a summed gain of the plurality of Raman pumps increases monotonically within each of said 4-channel bands.

18. The method of claim 16, wherein a wavelength spread occupied by the CWDM optical signal is approximately 153 nm.

19. The method of claim 16, wherein the net gain over the two 4-channel bands is between 17.7 dB and 21.2 dB.

* * * * *